United States Patent Office 3,538,074
Patented Nov. 3, 1970

3,538,074
BASIC MONO AZO DYESTUFFS
Gert Hegar, Schoenenbuch, Switzerland, assignor to Ciba Limited, Basel, Switzerland, a company of Switzerland
No Drawing. Filed May 17, 1967, Ser. No. 639,047
Claims priority, application Switzerland, May 27, 1966, 7,747/66; Feb. 21, 1967, 2,518/67
Int. Cl. C09b *29/36;* D06p *1/02*
U.S. Cl. 260—156          10 Claims

ABSTRACT OF THE DISCLOSURE

Basic azo dyestuffs of the benzeneazobenzene series with a dialkylamino group bound to the radical of the coupling component in para-position to the azo bridge and containing a tertiary or quaternary heterocyclic amine directly linked by its nitrogen atom to an alkyl carbon atom.

---

The present invention is based on the observation that valuable basic azo dyestuffs which are free from acidic groups imparting solubility in water, especially sulphonic or carboxylic acid groups, and which correspond to the formula (1)
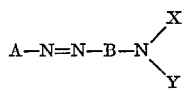

in which A represents a residue of an amine of the benzene series, B represents a benzene residue bound to the azo bridging group in para-position to the amino group, X represents a cyanoalkyl, alkoxyalkyl, acyloxyalkyl or cyanoalkoxyalkyl group, or an alkylene group containing alkyl —CO—, aryl —CO—, —SH, —S—R, —CO—OR, —CO—NH$_2$, —CO—NH—R or $$-CO-N-R$$
$$\phantom{-CO-N-}\underset{R_1}{|}$$

as substituent, and Y represents an alkylene residue to which a nitrogen atom which is a ring member of a heterocyclic tertiary or quaternary amine is directly linked to an alkyl carbon atom, R and $R_1$ each representing an alkyl or an aryl residue, may be obtained when (a) a diazo compound of the benzene series is coupled with a coupling component of the formula (2)
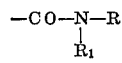

in which B represents a benzene residue capable of coupling in para-position to the amino group and X and Y have the meanings given above, or (b) an azo dyestuff of the formula (3)
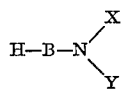

in which A, B and X have the meanings given above and $Y_1$ represents an alkylene residue containing an eliminatable atom or an eliminatable group, especially a halogen atom or a sulphatoalkyl residue, is reacted with a secondary or tertiary amine of the heterocyclic series, the nitrogen atom of which is a member of the heterocyclic ring or is the sole nitrogen member of the heterocyclic ring, or, when azo dyestuffs are to be made which contain a quaternary cyclic amino residue, the nitrogen atom of which is not bound to a double bond, (c) an azo dyestuff of the formula (4)
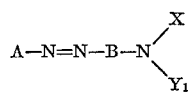

in which A, B and X have the meanings given above and $Y_2$ represents an alkylene residue to which a nitrogen atom which is a ring member of a heterocyclic tertiary amine is directly linked to an alkyl carbon atom, is reacted with a quaternating agent.

The amino group in the coupling components to be used in accordance with process (a) of the present invention, is on the one hand, substituted by a substituted alkyl group, for example, a β-cyanoethyl, β-methoxyethyl, β-cyanoethoxyethyl, β-acetoxyethyl or β-phenoxyethyl group, or a mercaptoethyl group which may be substituted or by a —CH$_2$—CO—CH$_3$, —CH$_2$—CO—C$_6$H$_5$,

—CH$_2$CH$_2$—CO—NH$_2$,

—CH$_2$CH$_2$—CO—OC$_2$H$_5$, —CH$_2$CH$_2$—CO—OC$_6$H$_5$, $$-CH_2CH_2$$
$$\phantom{-CH_2}\underset{CONHCH_3}{|}$$

or $$-CH_2CH_2-CO-N-C_6H_5$$
$$\phantom{-CH_2CH_2-CO-N-}\underset{CH_3}{|}$$

group, and, on the other, it must carry an aminoalkylene residue, the nitrogen atom of which is a member of a heterocyclic ring, especially a five-membered or six-membered ring, for example, a pyridine, pyrimidine, morpholine or piperidine ring.

The following are examples of coupling components of the kind described

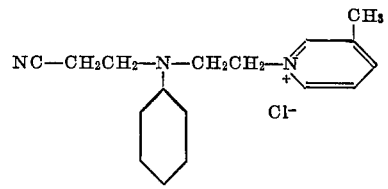

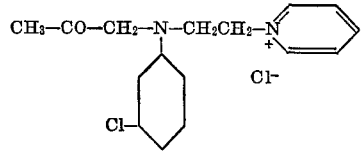

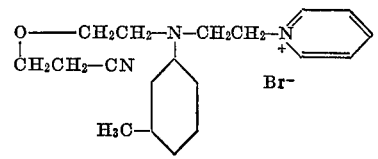

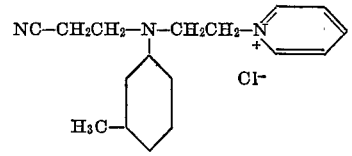

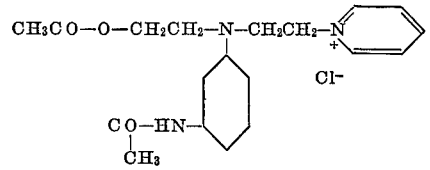

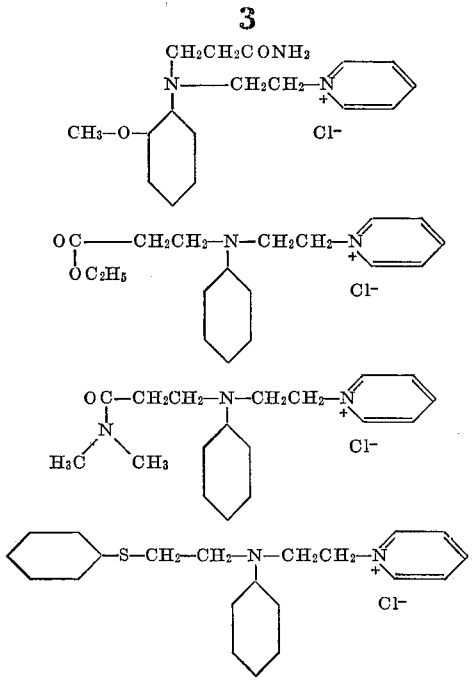

and also N,2 - (N'-phenyl-N',β-cyanoethyl)-aminoethylpyridinium chloride or bromide, N,2-(N'-phenyl-N'-β-acetoxyethyl) - aminoethylpyridinium chloride, N,2-(N'-phenyl - N' - β - cyanoethoxyethyl)-aminoethylpyridium chloride and the like. These compounds may be obtained by reacting the appropriate N-(halogen-alkyl)-aniline with a secondary or tertiary heterocyclic base, for example, pyridine, morpholine, thiomorpholine, quinoline, piperidine, pyrimidine, pyrrolidone and the like.

The diazo component used may be any diazotizable amine of the benzene series which does not contain acidic substitutents imparting solubility in water, but especially an amine which contains a single benzene residue having at least one electronegative substituent, for example, a nitro group, a halogen atom and/or a nitrile group.

Examples of diazo components of the benzene series which may be used are as follows:

aniline, 1-amino-3- or 4-chlorobenzene,
1-amino-4-bromobenzene,
1-amino-2-, 3- or 4-methylbenzene,
1-amino-2-, 3- or 4-nitrobenzene,
1-amino-4-cyanobenzene,
1-aminobenzene-3- or 4-methylsulphone,
1-amino-2-chlorobenzene-4-methylsulphone,
1-amino-2,5-dicyanobenzene,
1-amino-4-carbalkoxybenzene,
1-amino-2,4- or 2,5-dichlorobenzene,
1-amino-2,4-dibromobenzene,
1-amino-2-methyl-4- or 6-chlorobenzene,
1-amino-2-trifluoromethyl-4-chlorobenzene,
1-amino-2-cyano-4-chlorobenzene,
1-amino-2-cyano-4-nitrobenzene,
1-amino-2-carbomethoxy-4-chlorobenzene,
1-amino-2-methanesulphonyl-4-chlorobenzene,
1-amino-2-carbomethoxy-4-nitrobenzene,
1-amino-2-phenoxy-4-nitrobenzene,
1-amino-2-chloro-4-cyanobenzene,
1-amino-2-chloro-4-nitrobenzene,
1-amino-2-methoxy-4-nitrobenzene,
1-amino-2-chloro-4-carbethoxybenzene,
1-amino-2,4-dinitrobenzene,
1-amino-2,4-dicyanobenzene,
1-amino-2,6-dichloro-4-cyanobenzene,
1-amino-2,6-dichloro-4-nitrobenzene,
1-amino-2,5- or 2,6-dichlorobenzene-4-sulphonic acid methylamide,
1-amino-2,6-dibromobenzene-4-sulphonic acid amide,
1-amino-2,4-dinitro-6-chlorobenzene,
1-amino-2,4-dicyano-6-chlorobenzene,
1-amino-2,4,6-trichloro- or tribromo-benzene,
1-aminobenzene-3- or 4-sulphonic acid amide,
1-aminobenzene-3- or 4-sulphonic acid-N-methyl or diethyl amide,
4-aminoazobenzene,
4-amino-2'-chloroazobenzene,
4-amino-2',4'-dichloroazobenzene,
4-amino-3'-chloroazobenzene,
4-amino-2'-nitroazobenzene,
1-amino-4-nitroazobenzene-2-methylsulphone,
1-aminobenzene-4-carboxylic acid-β-methoxyethyl-ester,
4-amino-3-nitroazobenzene,
4-amino-3'-nitroazobenzene,
4-amino-2-methylazobenzene,
4-amino-4'-methoxyazobenzene,
4-amino-3-nitro-2'-chloroazobenzene,
4-amino-3-nitro-4'-chloroazobenzene,
4-amino-3-nitro-2',4'-dichloroazobenzene,
4-amino-3-nitro-4'-methoxyazobenzene,
4-aminodiphenyl, and
2- or 4-aminodiphenylether.

Diazotization of the above-mentioned diazo components may be carried out by known methods, for example, with the aid of a mineral acid, especially hydrochloric acid, and sodium nitrite.

Coupling may also be carried out in known manner, for example, in a neutral to acid medium, if necessary, in the presence of sodium acetate or a similar buffer which influences the rate of coupling, or a catalyst, for example, pyridine, or a salt thereof.

In process (b) of the present invention dyestuffs containing halogen atoms or sulphatoalkyl groups are reacted with secondary or tertiary amines of the heterocyclic series, for example, pyridine, picoline, lutidine, piperidine, piperazine, morpholine, thiomorpholine, quinoline, pyrimidine, pyrrolidine and the like, advantageously by heating in an excess of the amine in the presence or absence of a solvent. The dyestuffs containing halogen atoms or sulphatoalkyl groups may advantageously be obtained by diazotizing one of the above-mentioned amines of the benzene series and coupling the diazo compound with a sulphatoalkyl or halogenalkyl aniline, for example, N,β-methoxyethyl- or N,β-acetoxyethyl-N,β'-chloroethylaniline, N,β-cyanoethyl-N,β'-chloroethylaniline or N,β-cyanoethyl-N,β'-sulphatoethylaniline.

The starting materials used for process (c) of the present invention, which is naturally applied only for the manufacture of dyestuffs containing a quaternary heterocyclic amino residue, the nitrogen atom of which is not bound to a double bond, are the azo dyestuffs which correspond to the products ultimately desired, but which contain a tertiary heterocyclic amino residue. The said starting materials are treated with alkylating agents, advantageously with alkyl or aralkyl halides or with alkyl or aralkyl esters of sulphuric acid or organic sulphonic acids. Examples of alkylating agents are as follows: methyl chloride, methyl bromide, methyl iodide, benzyl chloride, trimethyloxonium boron fluoride, dimethyl sulphate, diethyl sulphate, benzenesulphonic acid methyl ester, paratoluenesulphonic acid ethyl ester or butyl ester. Alkylation is advantageously carried out by heating in an inert organic solvent, for example, in a hydrocarbon, for example, benzene, toluene or xylene, or a halogenated hydrocarbon, for example, carbon tetrachloride, tetrachloroethane, chlorobenzene or ortho-dichlorobenzene, or a nitro-hydrocarbon, for example, nitromethane, nitrobenzene or a nitronaphthalene. It is also possible to use anhydrides, acid amides or nitriles, for example, acetic anhydride, dimethylformamide or acetonitrile or also dimethylsulphoxide. The reaction may also be carried out in a large excess of alkylating agent instead of in an inert solvent. In this case, care must be taken to ensure that the mixture does not become unduly heated, because the reaction is highly exothermic. However, in most cases it is generally necessary to apply external heat to the reaction mixture to initiate the reaction, particularly when working in the presence of an organic solvent. In special cases, alkylation may also be carried out in an aqueous medium or with the use of an alcohol, if necessary, in the presence of a small amount of potassium iodide.

The dyestuff salts can be purified, if necessary, by dissolving them in water, when any unreacted starting dyestuff can be filtered off as an insoluble residue. The dyestuff may be precipitated from the aqueous solution by the addition of a water-soluble salt, for example, sodium chloride.

The dyestuffs obtained by the processes of the invention in so far as they contain a quaternary amino group, preferably contain as anion the residue of a strong acid, for example, sulphuric acid or a semi-ester thereof, or the residue of an arylsulphonic acid or a halogen ion. The said anions, which are introduced into the dyestuff molecule in accordance with the invention, may also be replaced by anions of other inorganic acids, for example, phosphoric or sulphuric acid, or by the anions of organic acids, for example, formic, acetic, chloracetic, oxalic lactic or tartaric acid; in some cases it is also possible to use the free bases. The dyestuff salts may also be used in the form of double salts, for example, with halides of elements of Group II of the Periodic Table, especially zinc chloride or cadmium chloride.

The dyestuffs obtained by the processes of the invention which contain a quaternated cyclic amino residue are suitable for dyeing and printing a very wide variety of synthetic fibres, for example, polyvinyl chloride, polyamide and polyurethane fibres, and also fibres made from polyesters of aromatic dicarboxylic acids, for example, polyethylene terephthalate fibres, but especially polyacrylonitrile fibres or polyvinylidene cyanide fibres (Darvan). By polyacrylonitrile fibres is meant principally polymers containing more than 80 percent of acrylonitrile, for example, 80 to 95 percent; they may also contain 5 to 20 percent of vinyl acetate, vinylpyridine, vinyl chloride, vinylidene chloride, acrylic acid, acrylic acid esters, methacrylic acid, methacrylic acid esters and so forth. These products are sold under the following registered trademarks: "Acrilan 1956," "Acrilan 41," "Creslan," "Orlon 44," "Crylor HH," "Leacril N," "Dynel," "Exlan," "Vonnel," "Verel," "Zefran," "Ssaniw," and also "Orlon 42," "Dralon," "Courtelle" and so forth.

The new dyestuffs produce on these fibres, which may also be dyed in admixture with one another, intense and level dyeings possessing good fastness to light and good properties of general fastness, specially good fastness to washing, perspiration, sublimation, crease-resist finishing. decatizing, hot-pressing, rubbing, carbonizing, water, sea water, dry cleaning, cross-dyeing and solvents. The new dyestuffs of the invention also display, inter alia, good stability in a wide pH range and good affinity in aqueous solutions of different pH values. Furthermore, the new dyestuffs reserve well on wool and other natural or synthetic polyamide fibres and possess a good fastness to kier-boiling.

The quaternated, water-soluble dyestuffs generally show little sensitivity to electrolytes, and some of them have exceptionally good solubility in water or organic solvents. Dyeing with the quaternated, water-soluble dyestuffs is generally carried out in an aqueous neutral or acid medium at the boil under atmospheric pressure or in a closed vessel at an elevated temperature and under superatmospheric pressure. The ordinary commercial levelling agents have no deleterious effect if used, but they are not necessary.

The said dyestuffs are also highly suitable for three-colour dyeing. Furthermore, by virute of their stability to hydrolysis, they may be used with advantage in high-temperature dyeing and for dyeing in the presence of wool. They may also be applied to the fibrous materials by printing processes. In this method of application, a printing paste is used which, in addition to the dyestuff, contains, for example, the usual printing adjuvants, for example, wetting and thickening agents. The dyestuffs are also suitable for the bulk-colouration of acrylonitrile polymerization products and other synthetic materials or solutions thereof, the colourations produced being fast to light and washing. They are also suitable for colouring oil paints and lacquers, and for dyeing cotton, especially mordanted cotton, cellulose, regenerated cellulose and paper.

The new dyestuffs manufactured by the processes of the invention which are insoluble in water and which contain a tertiary amino group are advatageously used in a state of fine division and in the presence of a dispersing agent, for example, soap, sulphite cellulose wast liquor or a synthetic detergent, or a combination of different wetting and dispersing agents. Prior to dyeing it is generally advantageous to convert the dyestuff into a dyeing preparation which contains a dispersing agent and the finely divided dyestuff in a form such that a fine dispersion is obtained when the preparation is diluted with water. Such dyestuff preparations may be obtained in known manner, for example, by precipitating the dyestuff from sulphuric acid and grinding the suspension so obtained with sulphite cellulose wast liquor. If necessary, the dyestuff may also be ground in a highly efficient grinding device in the dry or wet state in the presence or absence of a dispersing agent. They are also suitable for dyeing and printing a very wide variety of synthetic fibres, for example, polyacrylonitrile, polyvinyl chloride, polyamide or polyurethane fibres, but especially fibres made from polyesters of aromatic dicarboxylic acids, for example, polyethylene terephthalate fibres.

To obtain stronger dyeings, for example, on polyethylene terephthalate fibres, it is advantageous to add a swelling agent to the dyebath, or to carry out the dyeing process under superatmospheric pressure at a temperature above 100° C., for example, at 120° C. Suitable swelling agents are aromatic carboxylic acids, for example, benzoic acid or salicylic acid, phenols, for example, ortho- or para-hydroxydiphenyl, aromatic halogenated compounds, for example, chlorobenzene, orthodischlorobenzene or trichloro-benzene, phenylmethylcarbinol or diphenyl. When carrying out the dyeing process under superatmospheric pressure it is generally advantageous to render the dyebath slightly acid, for example, by the addition of a weak acid, for example, acetic acid.

The new dyestuffs having a tertiary amino group are specially suitable for application by the so-called thermofixation process in which the fabric to be dyed is impregnated at a temperature not exceeding 60° C. with an aqueous dispersion of the dyestuff which advantageously contains 1 to 50 percent of urea and a thickening agent, especially sodium alginate and squeezed in the usual manner. It is advantageously squeezed so as to retain 50 to 100 percent of its dry weight of dye-liquor.

To fix the dyestuff, the fabric so impregnated is heated to a temperature above 100° C., for example, to a temperature between 180 and 220° C., preferably after drying, for example, in a current of warm air.

The above-mentioned thermofixation process is specially suitable for dyeing union fabrics made from polyester fibres and cellulosic fibres, especially cotton. In this case, the padding liquor contains, in addition to the dyestuff to be used in accordance with the invention, dyestuffs which are suitable for dyeng cotton, for example, direct dyestuffs or vat dyestuffs, or especially so-called reactive dyestuffs, for example, dyestuffs which contain a chlorotriazine or a chlorodiazine residue. In the latter case, it is advantageous to add an agent capable of binding acid to the padding solution, for example, an alkali metal carbonate or an alkali metal phosphate or an alkli metal borate or perborate, or a mixture thereof. When using vat dyestuffs, the padded fabric has to be treated after heating with an aqueous alkaline solution of one of the reducing agents commonly used in vat dyeing.

The dyeings produced on polyester fibres by the said process are advantageously subjected to an after-treatment, for example, by heating with an aqueous solution of a non-ionic detergent.

The said dyestuffs are also suitable for dyeing union fabrics made from polyester fibre and wool; the wool portion of the fabric is reserved and can subsequently be dyed with a wool dyestuff.

The dyestuffs may also be applied by printing processes. In this method of application the printing pastes contain, for example, the finely divided dyestuff, if necessary, in admixture with one of the above-mentioned cotton dyestuffs, if necessary, in the presence of urea and/or an agent capable of binding acid together with the adjuvants ormally used in printing for example, wetting and thickening agents.

The process of the invention produces strong dyeings and prints possessing excellet properties of fastness, especially good fastness to light, sublimation, decatizing, washing and chlorinated water. A further advantage of the dyestuffs to be used in accordance with the invention is that they reserve well on wool and cotton.

The following examples illustrate the invention. Unless otherwise stated, the parts and percentages are by weight.

EXAMPLE 1

34.4 parts of a 10% paste of 2-chloro-4-nitroaniline are stirred together with 6 parts of concentrated hydrochloric acid 20 parts of ice and then diazotized with 20 parts of N sodium nitrite solution. Traces of insoluble residue are removed by filtration and the diazo solution is poured into a solution of 5.8 parts of N-(2,N'-phenyl-N',β-cyanoethyl)-aminoethylpyrimidinium chloride in 500 parts of iced water and the coupling mixture is rendered neutral to Congo paper by the addition of sodium acetate. The dyestuff which precipitates is isolated by filtration and dried. It dissolves in water to a clear solution and dyes polyacrylonitrile when applied in an aqueous bath scarlet tints which are very fast to light.

Fast dyestuffs which dye polyacrylonitrile fibres the tints indicated in Column III of the following table may be obtained by replacing the 2-chloro-4-nitroaniline with the diazo components listed in column II.

| I | II | III |
|---|---|---|
| 1 | 4-nitroaniline | Reddish yellow. |
| 2 | 2,6-dichloro-4-nitroaniline | Yellow-brown. |
| 3 | 2-cyano-4-nitroaniline | Red. |
| 4 | 4-amino-3-chlorophenylmethylsulphone | Yellow. |
| 5 | 2,4-dinitro-6-bromaniline | Claret. |

DYEING PRESCRIPTION 1 part of dyestuff is dissolved in 5,000 parts of water with the addition of 2 parts of 40% acetic acid. 100 parts of dried polyacrylonitrile staple-fibre yarn are entered into this dyebath at 60° C., the temperature is raised to 100° C. within 30 minutes and dyeing is carried out for one hour at the boil. The yarn is then well rinsed and dried.

EXAMPLE 2

36.5 parts of the water-insoluble monoazo dyestuff obtained by coupling diazotized 4-nitroaniline with N,2-chloroethyl-N,2'-methoxyethylaniline are stirred under reflux with 20 parts of pyridine until a test sample is soluble in water. The reaction mixture is then diluted with 200 parts of chlorobenzene and, after cooling, the dyestuff salt is isolated by filtration and dried. It produces an orange tint possessing very good fastness to light on polyacrylonitrile fibres.

Siimlar orange dyeings are obtained when the pyridine is replaced by quinoline, N-methylpiperidine, N-methylpyrrolidine, piperidine or morpholine.

EXAMPLE 3

11 parts of the dystuff obtained by coupling diazotized 2,6-dichloro-4-nitroaniline with the methanesulphonic acid ester of 2'-phenoxy-2''-hydroxy-N,N-diethyl-1,3-toluidine are stirred for 8 hours under reflux at 120 to 130° C. with 10 parts of N-methylmorpholine. The batch is then diluted with 400 parts of water, 5 parts of glacial acetic acid are added, the small amount of insoluble matter is removed by filtration, and the dyestuff in the filtrate is precipitated by the addition of 20 parts of sodium bromide. The dyestuff so obtained dyes polyacrylonitrile fibres fast brown tints.

Similar brown dyestuffs may be obtained when the N-methylmorpholine is replaced by pyridine, piperidine, morpholine or N-methylpiperidine.

The dyestuffs of the general formula

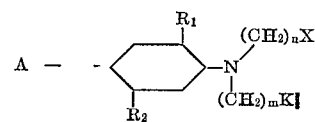

and defined by the substituents A, $R_1$, $R_2$, X, K, $n$ and $m$ indicated in the following Table may be obtained by the same process.

| A | $R_1$ | $R_2$ | X | K | $n$ | $m$ | Tint |
|---|---|---|---|---|---|---|---|
| 1. Cl—⟨⟩— | H | $CH_3$ | —CN | —N⟨⟩ | 2 | 2 | Yellow. |
| 2. $O_2N$—⟨⟩(CN)— | H | H | —CN | $CH_3$, $CH_2$—$CH_2$, N, $CH_2$, $CH_2$—$CH_2$ | 2 | 2 | Red. |
| 3. Same as above | —$OCH_3$ | $CH_3$ | —$OCH_3$ | —N⟨⟩ | 2 | 2 | Violet. |
| 4. $H_2NO_2S$—⟨Cl,Cl⟩— | H | H | —$OCH_3$ | Same as above | 2 | 3 | Yellow. |
| 5. $O_2N$—⟨Cl⟩— | H | H | —O—⟨⟩ | do | 2 | 2 | Red. |

TABLE—Continued

| | A | R₁ | R₂ | X | K | n | m | Tint |
|---|---|---|---|---|---|---|---|---|
| 6 | Same as above | H | CH₃ | Same as above | —N(CH₂—CH₂)(CH₂—CH₂)O | 2 | 2 | Red. |
| 7 | O₂N—⟨Cl,Cl⟩— | H | H | —S—⟨⟩ | —N(CH₃)(CH₂—CH₂)(CH₂—CH₂) | 2 | 2 | Yellow-brown. |
| 8 | Same as above | H | H | —COCH₃ | —N⟨pyridine⟩ | 1 | 2 | Do. |
| 9 | do | H | H | —OCOCH₃ | —N(CH₂—CH₂)(CH₂—CH₂)CH₂ | 2 | 2 | Do. |
| 10 | CH₃O₂S—⟨Cl⟩— | H | CH₃ | —COOCH₃ | —N⟨pyridine⟩ | 2 | 2 | Yellow. |
| 11 | Same as above | H | H | —CON(CH₃)(CH₃) | Same as above | 2 | 2 | Do. |
| 12 | O₂N—⟨⟩— | OCH₃ | CH₃ | —OCH₂CH₂CN | do | 2 | 2 | Red. |
| 13 | Same as above | H | H | —CO—⟨⟩ | —N⟨pyridine⟩ | 1 | 2 | Orange. |
| 14 | O₂N—⟨CN⟩— | H | CH₃ | —OC₂H₅ | N(CH₃)(CH₂—CH₂)(CH₂—CH₂)O | 2 | 2 | Claret. |
| 15 | Same as above | H | CH₃ | —OCH₃ | —N(CH₂—CH₂)(CH₂—CH₂)CH₂ | 2 | 2 | Do. |
| 16 | H₂NO₂S—⟨⟩— | H | CH₃ | —CN | —N⟨pyridine⟩ | 2 | 2 | Yellow. |
| 17 | H₃COOC—⟨⟩— | H | H | —OCH₃ | Same as above | 2 | 2 | Do. |
| 18 | O₂N—⟨SO₂CH₃⟩— | H | CH₃ | —O—⟨⟩ | do | 2 | 3 | Claret. |
| 19 | O₂N—⟨OCH₃⟩— | H | H | —CONH₂ | do | 2 | 2 | Red. |
| 20 | O₂N—⟨NO₂⟩— | OCH₃ | CH₃ | —CN | do | 2 | 2 | Violet. |

EXAMPLE 4

13.2 parts of the monoazo dyestuff obtained by coupling diazotised 2-chloro-4-nitroaniline with N,2-(N'-phenyl-N',2'-cyanoethyl)-aminoethylpiperidine are dissolved in 200 parts of chlorobenzene and a solution of 5.2 parts of dimethylsulphate in 10 parts of chlorobenzene is then added at 100° C. The batch is stirred at 110 to 120° C. until the quaternary dyestuff salt precipitates, the batch is allowed to cool and the dyestuff is then isolated by filtration and dried. The dyestuff so obtained produces very fast scarlet tints on polyacrylonitrile fibres.

Quaternation may also be effected with equivalent amounts of diethyl sulphate, benzyl chloride, or para-toluenesulphonic acid methyl, ethyl or butyl ester instead of with dimethyl sulphate.

A dyestuff having similar properties which dyes polyacrylonitrile fibres yellow-brown tints may be obtained by the same process by coupling diazotised 2,6-dichloro-4-nitroaniline with N,2 - (N'-phenyl-N',2'-phenthioethyl)-aminoethylpyrrolidine and then quaternating the azo dyestuff so obtained in the manner indicated.

I claim:
1. Basic azo dyestuff of the formula

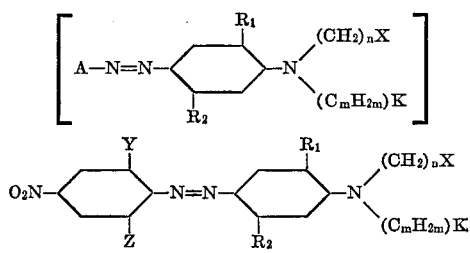

wherein Y and Z each is selected from, the group consisting of hydrogen, chlorine, bromine, and cyano, $R_1$ and $R_2$ are each selected from the group consisting of hydrogen, lower alkyl and lower alkoxy, X is selected from the group consisting of methoxy, ethoxy, phenoxy, phenthio, lower alkanoyl, lower alkanoyloxy, benzoyl, cyano, cyano lower alkoxy, carbonamido and N-lower alkyl carbonamido, $n$ is an integer from 1–2, $m$ is an integer from 2–3 and K is a heterocylic quaternary amine selected from the group consisting of unsubstituted or lower alkyl substituted pyridine, piperidine, morpholine or pyrrolidine, wherein K is bound to the alklene bridge via its nitrogen atom and containing, when quatermized, an anion of a strong inorganic acid, sulfonic acid semi ester, carboxylic acid and sulfonic acid.

2. A basic azo dyestuff as claimed in claim 1, wherein K is unsubstituted or lower alkyl substituted pyridinium radical, $n$ is 2, X is selected from the group consisting of cyano, cyanothoxy and lower alkoxy and $R_1$ and $R_2$ are each hydrogen.

3. The basic azo dyestuff according to claim 1 corresponding to the formula

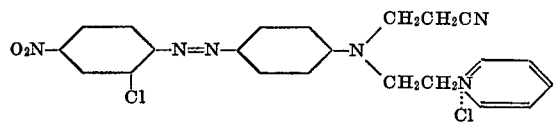

4. The basic azo dyestuff according to claim 1 corresponding to the formula

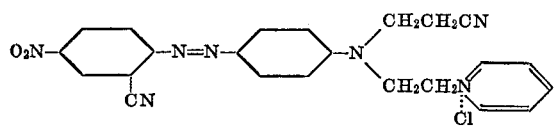

5. The basic azo dyestuff according to claim 1 corresponding to the formula

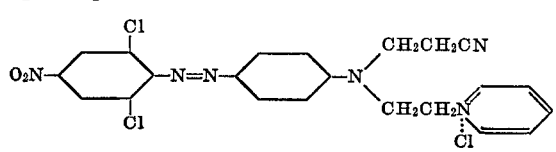

6. The basic azo dyestuff according to claim 1 corresponding to the formula

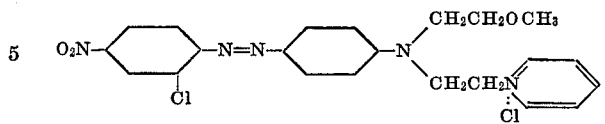

7. The basic azo dyestuff according to claim 1 corresponding to the formula

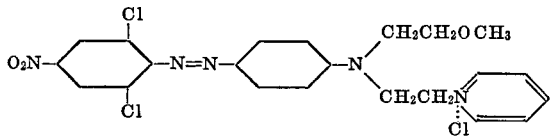

8. The basic azo dyestuff according to claim 1 corresponding to the formula

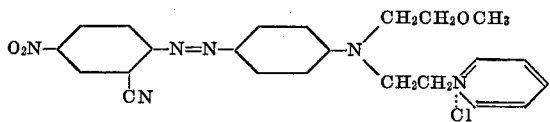

9. The basic azo dyestuff according to claim 1 corresponding to the formula

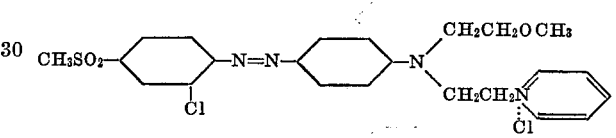

10. The basic azo dyestuff according to claim 1 corresponding to the formula

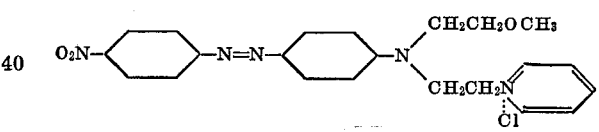

References Cited
UNITED STATES PATENTS

| | | | |
|---|---|---|---|
| 2,099,525 | 11/1937 | Krzikalla et al. | 260—156 X |
| 3,148,178 | 9/1964 | Wallace et al. | 260—152 |
| 3,148,181 | 9/1964 | Wallace et al. | 260—207 |
| 3,402,167 | 9/1968 | Entschel | 260—154 |

CHARLES B. PARKER, Primary Examiner

D. M. PAPUGA, Assistant Examiner

U.S. Cl. X.R.

260—146, 152, 154, 294.8, 294.9, 295; 8—41, 55, 542

CASE 5927/E

PO-1050
(5/69)

UNITED STATES PATENT OFFICE
CERTIFICATE OF CORRECTION

Patent No. 3,538,074      Dated November 3, 1970

Inventor(s) GERT HEGAR

It is certified that error appears in the above-identified patent and that said Letters Patent are hereby corrected as shown below:

Column 11, claim 1, delete the bracketed formula.

Signed and sealed this 13th day of July 1971.

(SEAL)
Attest:

EDWARD M. FLETCHER, JR.
Attesting Officer

WILLIAM E. SCHUYLER, JR.
Commissioner of Patents